May 15, 1951     H. V. REES     2,552,737
PROCESS FOR PRODUCING SYNTHESIS GAS
Filed May 25, 1945
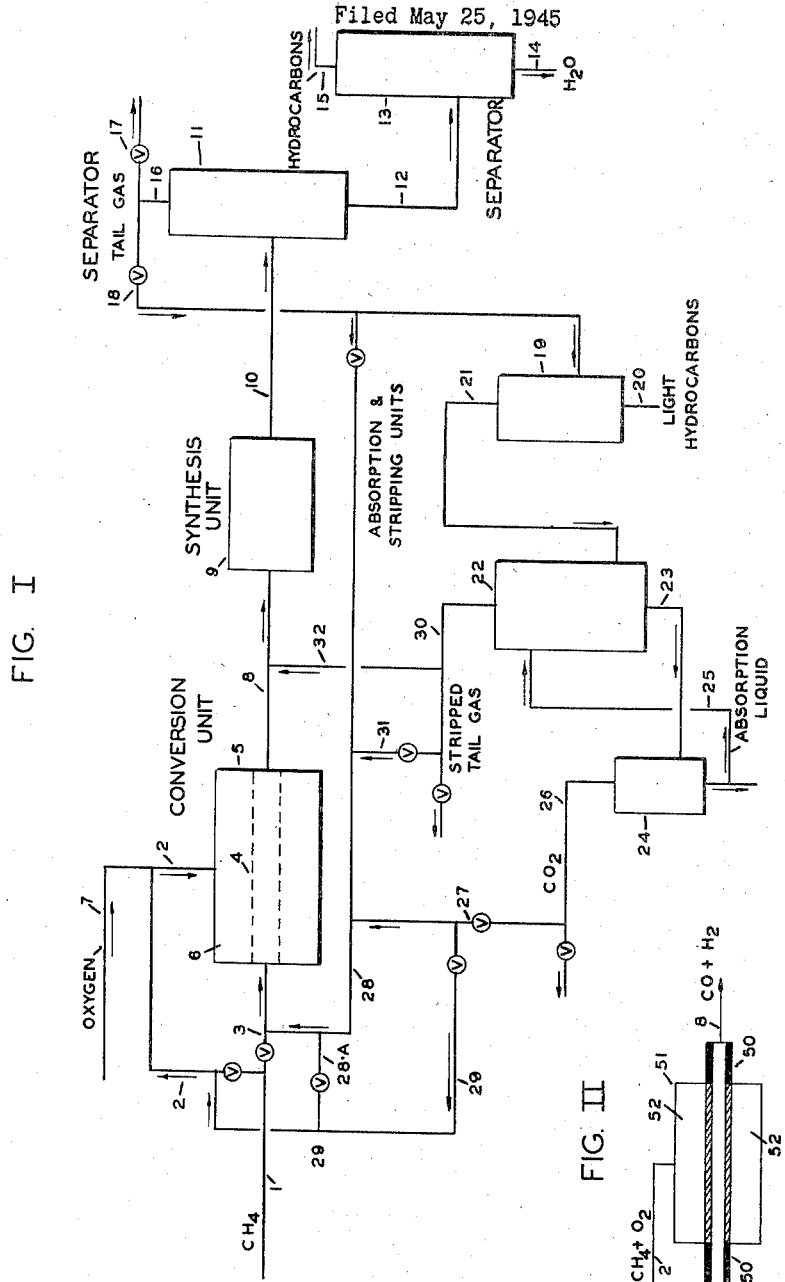
FIG. I
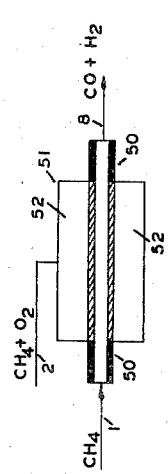
FIG. II
HARRY V. REES
INVENTOR
BY    HIS ATTORNEY Patented May 15, 1951

2,552,737

UNITED STATES PATENT OFFICE 2,552,737

PROCESS FOR PRODUCING SYNTHESIS GAS

Harry V. Rees, Chappaqua, N. Y., assignor to Texaco Development Corporation, New York, N. Y., a corporation of Delaware Application May 25, 1945, Serial No. 595,710

6 Claims. (Cl. 48—214)

This invention relates to the manufacture of hydrocarbons, oxygenated hydrocarbons and the like by a process involving conversion of low boiling hydrocarbons into carbon monoxide and hydrogen, which latter are in turn converted into the aforesaid products.

The invention involves reacting a light hydrocarbon such as methane with $CO_2$ and steam, advantageously formed concurrently and in the same reaction zone by combustion of a portion of the feed hydrocarbon, to thereby produce a synthesis gas containing CO and $H_2$. The resulting synthesis gas is subjected to the action of a synthesis catalyst so as to effect conversion of CO and $H_2$ into the desired synthetic products. The products of the synthesis reaction may include hydrocarbon gas and also substantial amounts of $CO_2$, CO and $H_2$. Therefore, provision is made for separating these gaseous constituents from the synthesis products and recycling them to the process, as will be described in more detail.

The gaseous products from the synthesis reaction may include, besides the aforesaid gases, other gaseous materials such as nitrogen, and provision is made for discharging such materials from the system.

A particular feature of the invention has to do with the method for preparing the synthesis gas which will now be described.

In accordance with the invention, the supply of hydrocarbon feed gas is split into first and second streams. The first stream is mixed with oxygen or an oxygen-containing gas in proportions suitable to provide a combustible mixture. This mixture is subjected to surface combustion on the interior surface of a porous tubular reaction zone constructed from a refractory material capable of withstanding elevated temperatures. The second stream of hydrocarbon gas is caused to flow within the tubular reaction zone wherein the second stream hydrocarbons are brought into intimate contact with the hot gaseous products of combustion resulting from the aforesaid surface combustion.

Temperature conditions are maintained within the reaction zone such that the second stream hydrocarbons react with $CO_2$ and steam formed from the surface combustion, thereby producing gaseous products of conversion containing CO and $H_2$.

The resulting stream of synthesis gas, after suitable adjustment of temperature, is passed to a synthesis unit wherein CO and $H_2$ are converted into compounds containing one or more carbon atoms per molecule. As previously set forth, $CO_2$, CO and $H_2$ are removed from the products of the synthesis reaction and recycled all or in part to the feed stream passing through the interior of the aforesaid conversion reaction tube. Provision may be made, if desired, for treating the tail gas from the synthesis reaction so as to separately remove $CO_2$ therefrom, the separated $CO_2$ being recycled all or in part to the inlet of the reaction tube, while residual tail gas comprising mainly CO and $H_2$ is recycled all or in part to provide a portion of the gas stream used for effecting surface combustion.

When nitrogen is present in the oxygen feed gas then provision is made for venting nitrogen from the system. This may be done by discharging a portion of the residual tail gas, with or without first removing CO and $H_2$ therefrom. Provision may be made for recycling residual tail gas, or CO and $H_2$ separated therefrom, to the synthesis reaction.

The invention is of particular application as applied to the type of conversion process described in the copending application, Serial No. 586,004, of Harry V. Rees and Clifford G. Ludeman, filed March 31, 1945, for Manufacture of Hydrocarbons and the Like, issued as U. S. Patent No. 2,486,879.

The conversion unit for effecting the conversion of normally gaseous hydrocarbons into synthesis gas advantageously comprises a porous tube or plurality of porous tubes constructed from a refractory material such as carborundum. The porous tubes are supported within or extend through a chamber. A combustible gas mixture is maintained within the chamber to provide a gas blanket surrounding the porous tubes. Sufficient pressure is maintained upon the combustible gas mixture so that it permeates the pores of the porous tubes and thus passes to the interior surfaces thereof upon which it undergoes surface combustion, thereby maintaining the interior surfaces of the tubes at a state of incandescence.

Advantageously, the composition of the gaseous combustible mixture is such that it is substantially entirely consumed by combustion to form $CO_2$ and steam.

A separate stream of hydrocarbon gas is introduced to the inlet of each porous tube, advantageously after suitable preheating, and caused to flow therein in intimate mixture with the hot products of surface combustion so that the hydrocarbons react with the products of combustion to produce the gaseous mixture containing CO and $H_2$. If desired, steam may be introduced with the separate stream of hydrocarbon gas in order to assist in the reaction.

An advantage of the invention is that it provides a simple and effective means for converting hydrocarbons into synthesis gas at relatively high temperatures in the range of 3000 to 3600° F. and higher.

A further advantage is that by employing these high temperatures the conversion is effectively carried out without the necessity for employing conversion catalysts.

The invention also provides a simple means for effecting transfer of heat units between the exothermic and endothermic reactions involved.

The invention is effectively employed in a process wherein an iron type of catalyst is used in the synthesis reaction and which type of catalyst results in the production of synthesis products containing $CO_2$ in substantial amount. In accordance with the present invention, such $CO_2$ is recycled and ultimately converted into valuable products. Advantage is taken of this $CO_2$ recycle so as to avoid the presence of substantial amounts of nitrogen in the system, since this recycling of $CO_2$ reduces the amount of oxygen feed gas required.

It is also contemplated using substantially pure oxygen gas so as to reduce further the amount of nitrogen entering the system. It is contemplated venting tail gas from the system in sufficient amount so that the nitrogen content of the synthesis gas being produced will contain not in excess of about 20 mol per cent nitrogen.

In order to describe the invention in more detail reference will now be made to the figures of the accompanying drawing.

Figure 1 comprises a diagram of flow for the overall process.

Figure 2 illustrates diagrammatically the construction of a conversion unit used for converting normally gaseous hydrocarbons into synthesis gas.

Referring to Figure 1, a stream of natural gas hydrocarbons consisting essentially of methane, for example, is conducted from a source not shown through a pipe 1. This feed hydrocarbon gas may comprise hydrocarbons having from 1 to 4 carbon atoms per molecule.

This feed gas stream is split into minor and major proportions, the minor stream passing through a branch pipe 2 while the major stream passes through a pipe 3.

These streams may pass through suitable heat exchange apparatus or a furnace (not indicated in the drawing) fired by the vented tail gas to which reference will be made later so as to adjust the temperature of each stream to the level desired prior to further processing.

The major stream from the pipe 3 passes through a reaction conduit 4 shown in dotted lines within a conversion unit 5.

The minor stream diverted through the pipe 2 flows into the chamber 6 surrounding the reaction tube 4. The stream of oxygen or gas rich in free oxygen is conducted, with or without preheating, from a source not shown through a pipe 7 and likewise introduced to the chamber 6 to provide with the minor stream hydrocarbons a combustible mixture of gas.

The combustible gas mixture may be maintained within the chamber 6 at substantially combustion temperature; that is, at a temperature in the range of about 800 to 1200° F. It is also maintained under a pressure sufficient to force the gas through the pores of the reaction tube 4 so that it undergoes surface combustion on the interior wall surface of the reaction tube 4, thereby maintaining the wall surface at temperatures in the range 3000 to 3600° F. or more.

The major stream hydrocarbons thus react with $CO_2$ and steam, formed by the surface combustion and also with $CO_2$ recycled from the synthesis reaction, to produce CO and $H_2$.

The effluent stream of synthesis gas leaves the outlet end of the reaction tube 4 and flows through a pipe 8 to a synthesis unit 9. Before entering the synthesis reaction, the gas flowing through the pipe 8 is advantageously subjected to heat exchange (in apparatus not shown) so as to reduce it to a temperature effective for the synthesis reaction; for example, to a temperature ranging from about 300 to 600° F.

In the synthesis, the gas is subjected to contact with a synthesis catalyst which may comprise about 30% iron, 60% diatomaceous earth or other supporting material, and about 10% promoting substances such as the oxides of thorium or magnesium. It will be understood, of course, that instead of iron, other hydrogenating metals such as cobalt and nickel may be employed in the catalyst.

As a result of contact with the synthesis catalyst, CO and $H_2$ react to form hydrocarbons or oxygenated hydrocarbons which are mainly normally liquid, although some gaseous compounds such as methane are formed and a substantial proportion of the CO is converted to $CO_2$, particularly when an iron type of synthesis catalyst is employed. The products of reaction also include some water.

The products of the synthesis reaction are conducted through a pipe 10 to a separator 11 wherein gaseous hydrocarbons, $CO_2$, and unreacted CO and $H_2$ are continuously separated from the liquid constituents. The synthesis products are cooled before or after introduction to the separator 11 so as to effect condensation of normally liquid compounds and steam.

Assuming that the process is operated to produce hydrocarbons, the liquid hydrocarbons and water accumulating in the separator 11 are drawn off through a pipe 12 to a separator 13 wherein separation between hydrocarbons and water occurs. The water is discharged from the system through a pipe 14 while the hydrocarbons are discharged through pipe 15. These hydrocarbons comprise normally liquid constituents including naphtha and higher boiling hydrocarbons.

The gaseous fraction separated in the separator 11 is discharged through a pipe 16. Provision is made for discharging all or a portion of this gaseous fraction through a pipe 17. However, it is preferred to conduct this gaseous fraction through a pipe 18 to an absorption unit 19 which may be of conventional type adapted to effect removal of light hydrocarbons such as propane, butane, pentane and heavier from the residual or tail gas. These light hydrocarbons are discharged through a pipe 20.

The residual gas is conducted through a pipe 21 to a stripping unit 22 adapted to effect removal of $CO_2$ from the gas. This unit may be of the absorption type wherein the $CO_2$ is absorbed in a suitable scrubbing liquid.

The $CO_2$ solution is drawn off through a pipe 23 to a still 24 wherein $CO_2$ is liberated from the absorption liquid, the latter being returned through a pipe 25 to the stripping unit 22.

The liberated $CO_2$ is conducted through pipes 26, 27 and 28 to the previously-mentioned pipe 3 leading to the conversion reaction tube 4. If desired, part of this CO₂ may be diverted through pipe 29 and pipe 2 to chamber 6.

The stripped tail gas from which CO₂ has been removed is conducted through a pipe 30. This gas may be discharged all or in part from the system or instead may be passed in part through pipes 31, 28 and 3, for return to the conversion reaction. If desired, this stripped tail gas containing unreacted CO and H₂ may be recycled in part through pipe 32 to the synthesis unit 9.

Also, as indicated, provision may be made for recycling directly to the conversion unit a portion of the tail gas from the top of the separator 11. The desired portion of this gas may pass through pipes 18, 28, 29 and 3 for recycling.

The oxygen gas entering the system through pipe 7 may consist of about 99½% oxygen or may contain from about 50 to 100% oxygen.

It is advantageous to adjust the proportions and compositions of the several reactant streams passing to the conversion unit 5 so that the synthesis gas stream flowing through the pipe 8 will consist essentially of CO and H₂ in predetermined proportions; for example, in the proportion of about 1 molecule of CO to 1 molecule of H₂ such as is desired when using the synthesis gas for the production of normally liquid hydrocarbons over an iron catalyst.

Reference will now be made to Figure 2 which represents diagrammatically a view of a section taken along the diameter of a conversion unit consisting of a single reaction conduit extending through an individual combustible gas chamber.

The numeral 50 designates a single porous reaction tube formed from a refractory material such as carborundum.

The numeral 51 designates a cylindrical metal or ceramic chamber through which the tube 50 extends.

The numeral 52 designates the annular space between the interior surface of the chamber 51 and the exterior surface of the tube 50.

The portion of the tube 50 within the chamber 51 is porous, while the ends thereof projecting beyond the closed ends of the chamber 51 are impervious.

As indicated in Figure 1, a stream of methane gas flows through a pipe 1 to the inlet end of the tube 50 while a stream of methane and oxygen flows through a pipe 2 to the annular space 52.

The products of conversion comprising CO and H₂ are discharged from the outlet end of the tube 50 through pipe 8.

In commencing the operation, the mixture of combustible gas is first introduced through pipe 2 to provide a blanket of gas in the annular space 52 surrounding the porous portion of the reaction tube. This blanket of gas is maintained under sufficient pressure to force it through the pores of the tube at a rate sufficient to prevent flame propagation back through the pores into the annular space. The combustible mixture diffusing through the pores to the inner and porous surface of the tube 50 is ignited at the inner surface so that it undergoes surface combustion, thereby maintaining the inner surface of the tube in an incandescent condition. Combustion thus takes place without the appearance of actual flame.

The combustible gas chamber 51 may be surrounded with a concentric and outer chamber, not shown, thus providing an annular space between the inner surface of the outer chamber and the outer surface of the cylinder 51. This annular space is then used as a preheating chamber for any one of the reaction streams.

It will be understood that instead of a single conversion tube 50, the conversion unit may comprise a plurality of such tubes extending through a closed combustible gas chamber. Also if desired, the unit may be arranged so that surface combustion occurs on the exterior surface of the tubes.

The following is an example in which a hydrocarbon gas having the following composition is charged to produce synthesis gas for conversion with an iron type synthesis catalyst:

$N_2$—0.4 mol per cent
$CO_2$—0.1 mol per cent
$CH_4$—98.3 mol per cent
$C_2H_6$—1.2 mol per cent This gas is divided into two streams, namely a minor stream of 23.6 mol per cent and a major stream of about 76.4 mol per cent. The minor stream is passed through the pipe 2 to the conversion unit 5 at the rate of about 49.25 pounds per hour, while the major stream is passed through the pipe 3 at the rate of about 149.71 pounds per hour.

The synthesis gas passing through the pipe 8 to the synthesis unit 9 amounts to about 1000 pounds per hour and has the following composition:

$H_2$—42.5 mol per cent
$N_2$—11.3 mol per cent
$O_2$—0.1 mol per cent
$CO$—33.3 mol per cent
$CO_2$—3.8 mol per cent
$H_2O$—9.0 mol per cent The combined light and heavy hydrocarbons discharged through the pipes 15 and 20, respectively, amount to about 122 pounds per hour and are composed of about 48 pounds of gasoline, 31 pounds of gas oil and 43 pounds wax.

The water discharged through the pipe 14 amounts to about 156 pounds per hour. The tail gas flowing through the pipe 21 amounts to about 722 pounds per hour and has the following composition:

$H_2$—29.99 mol per cent
$N_2$—21.65 mol per cent
$CO$—10.84 mol per cent
$CO_2$—25.57 mol per cent
$H_2O$—6.46 mol per cent
$CH_4$—5.0 mol per cent
$C_2H_4$—0.04 mol per cent
$C_2H_6$—0.30 mol per cent
$C_3H_6$—0.04 mol per cent
$C_3H_8$—0.11 mol per cent The recycled CO₂ gas flowing through the pipe 26 amounts to about 352 pounds per hour and has the following composition:

$H_2$—1.7 mol per cent
$N_2$—0.9 mol per cent
$CO$—0.7 mol per cent
$CO_2$—89.8 mol per cent
$H_2O$—6.5 mol per cent
$CH_4$—0.4 mol per cent While mention is made of recycling CO₂ to the pipe 3, the operation may be such that all of the CO₂ is recycled to the pipe 2, or may be split in any proportions between the two. Likewise, the recycled stripped tail gas may be split in any proportions between pipes 28 and 28a to thereby distribute it as desired between pipes 2 and 3.

The invention is not only applicable to the production of normally liquid hydrocarbons but also to the production of other compounds such as oxygenated hydrocarbons, including compounds such as methanol, ethanol, formaldehyde and formic acid, acetic acid, acetone, etc.

It is contemplated that the gaseous feed hydrocarbon entering the combustible mixture zone may be mixed therein with oxygen in stoichiometrical proportions so as to effect substantially complete combustion of the hydrocarbons in the mixture into $CO_2$ and $H_2O$. On the other hand, a deficiency of oxygen may be used so as to result in the formation of some oxygenated compounds such as aldehydes within the reaction conduit or reaction zone. In this latter case, the resulting synthesis gas will contain this oxygenated material which may pass with CO and $H_2$ directly to the synthesis reaction zone.

Obviously many modifications and variations of the invention as above set forth may be made without departing from the spirit and scope thereof, and therefore only such limitations should be imposed as are indicated in the appended claims.

I claim:

1. The method of preparing synthesis gas containing CO and $H_2$ from normally gaseous hydrocarbons involving reaction of a feed hydrocarbon with $CO_2$ and $H_2O$ during flow through a conduit having a porous wall and formed from a refractory material capable of withstanding elevated temperatures, which comprises surrounding the exterior of said porous wall with a combustible mixture comprising a gaseous hydrocarbon together with free oxygen in relative combining proportion at which water vapor and carbon dioxide comprise the products of combustion under a pressure such that said combustible mixture passes through said pores to the interior wall surface, effecting surface combustion of said mixture on said interior wall surface thereby forming hot combustion gas containing $CO_2$ and $H_2O$, introducing to the inlet of said conduit a stream of hydrocarbon gas in the proportions required for reaction with said $CO_2$ and $H_2O$ to form essentially CO and $H_2$, effecting reaction of so-introduced hydrocarbons with said $CO_2$ and $H_2O$ during flow through the interior of said conduit to form essentially CO and $H_2$, and discharging from the outlet of said conduit a stream of effluent gas containing CO and $H_2$ in proportions suitable for said synthesis gas.

2. The method of preparing synthesis gas containing CO and $H_2$ derived from normally gaseous hydrocarbons and involving reaction of a gaseous hydrocarbon with $CO_2$ and $H_2O$ during flow through a reaction conduit having a porous wall and formed from a refractory material capable of withstanding elevated temperatures, which comprises maintaining a supply of hydrocarbon feed gas containing a normally gaseous hydrocarbon, splitting said hydrocarbon feed into first and second streams, introducing said first stream in admixture with free oxygen in an amount sufficient to burn said hydrocarbon with the formation of essentially $H_2O$ and $CO_2$ to a zone surrounding said reaction conduit under pressure sufficient to force the mixture through the porous wall to the interior wall surface of the conduit, effecting surface combustion of said mixture on said interior wall surface such that said mixture is converted to combustion gas containing essentially $CO_2$ and $H_2O$ and the said interior wall surface is maintained at incandescence, introducing said second stream of gaseous hydrocarbon to the inlet of said conduit in the proportions required for combination with said $CO_2$ and $H_2O$ to produce essentially CO and $H_2$, effecting reaction of said second stream hydrocarbons with said $CO_2$ and $H_2O$ in the presence of said incandescent surface during flow through the interior of said conduit to form essentially CO and $H_2$ and discharging from the outlet of said conduit a stream of effluent gas containing CO and $H_2$ in proportions suitable for said synthesis gas.

3. In the preparation of a synthesis gas comprising hydrogen and carbon monoxide, the steps which include passing a combustible mixture of hydrocarbon gas together with free oxygen in a relative combining proportion effective to convert the hydrocarbon into combustion products comprising predominantly carbon dioxide and water vapor, through a porous wall formed of refractory material capable of withstanding elevated temperatures, effecting surface combustion of the gaseous mixture at the outlet surface of said porous wall at an elevated temperature in the range of incandescence, simultaneously passing a second stream of gaseous hydrocarbon across said incandescent surface, effecting endothermic oxidation of said second stream of gaseous hydrocarbons by said surface combustion products in the presence of said incandescent surface to form carbon monoxide and hydrogen, and discharging from the vicinity of said surface the product gas containing substantial proportions of carbon monoxide and hydrogen.

4. In the preparation of synthesis gas containing CO and $H_2$ from normally gaseous hydrocarbons involving reaction of feed hydrocarbons with $CO_2$ and $HO_2$, the method which comprises maintaining within a conversion zone a porous wall formed from a refractory material capable of withstanding elevated temperatures and adapted to provide a surface for effecting surface combustion maintaining on one side of said wall a body of combustible gas comprising a gaseous hydrocarbon together with sufficient free oxygen to burn the hydrocarbon to $H_2O$ and $CO_2$ under a pressure such that said gas passes through the pores to the opposite side of said wall, effecting surface combustion of said combustible gas on the surface of said opposite side such that said combustible gas is substantially entirely consumed to form hot combustion gas containing $CO_2$ and $H_2O$, directing gaseous hydrocarbons in the proportions required for combination with said $CO_2$ and $H_2O$ to produce essentially CO and $H_2$ onto said opposite side of said wall such that said hydrocarbons commingle with said gaseous products of combustion in at least close proximity to said surface combustion, effecting reaction of so-directed hydrocarbons with said $CO_2$ and $H_2O$ so as to form essentially CO and $H_2$, and discharging from the conversion zone a stream of effluent gas containing CO and $H_2$ in proportions suitable for said synthesis gas.

5. A method of preparing synthesis gas containing CO and $H_2$ from normally gaseous hydrocarbons involving reaction of feed hydrocarbons with $CO_2$ and $H_2O$ during flow through a conduit having a porous wall and formed from a refractory material capable of withstanding elevated temperatures, which comprises surrounding the exterior of said porous wall with a combustible gaseous mixture comprising a gasiform hydrocarbon together with free oxygen in a combining proportion sufficient to consume said hydrocarbon with the production of essentially $H_2O$ and $CO_2$ under a pressure such that said combustible mixture passes through said pores to the interior wall surface, effecting surface combustion of said mixture at said interior wall surface such that said mixture is converted essentially to $CO_2$ and $H_2O$ at elevated temperature, introducing to the inlet of said conduit a stream of hydrocarbon gas in the proportions required for combination with said $CO_2$ and $H_2O$ to produce essentially CO and $H_2$, effecting reaction of so-introduced hydrocarbons with said products of said combustion during flow within the interior of said conduit so as to form essentially CO and $H_2$, and discharging from the outlet of said conduit a stream of effluent gas containing CO and $H_2$ in proportions suitable for said synthesis gas.

6. A method of preparing synthesis gas containing CO and $H_2$ from normally gaseous hydrocarbons involving reaction of feed hydrocarbons with $CO_2$ and $H_2O$ during flow through a conduit having a porous wall and formed from a refractory material capable of withstanding elevated temperatures, which comprises surrounding the exterior of said porous wall with a combustible gaseous mixture consisting essentially of methane and oxygen under pressure sufficient to cause said mixture to pass through said ports to the interior wall surface, effecting surface combustion of methane and oxygen at said interior wall surface relative combining proportion at which the products of combustion are essentially $H_2O$ and $CO_2$ such that the mixture is substantially entirely converted by combustion to $CO_2$ and $H_2O$, introducing to the inlet of said conduit a separate stream of methane in the proportions required for combination with said $CO_2$ and $H_2O$ to produce essentially CO and $H_2$, effecting reaction of so-introduced methane with said products of said combustion during flow within the interior of said conduit to form essentially CO and $H_2$, and discharging from the outlet of said conduit a stream of effluent gas consisting essentially of CO and $H_2$.

HARRY V. REES.

REFERENCES CITED

The following references are of record in the file of this patent:

UNITED STATES PATENTS

| Number | Name | Date |
|---|---|---|
| 1,957,743 | Wietzel et al. | May 8, 1934 |
| 2,062,358 | Frolich | Dec. 1, 1936 |
| 2,106,137 | Reed | Jan. 18, 1938 |
| 2,243,869 | Keith | June 3, 1941 |
| 2,274,064 | Howard | Feb. 24, 1942 |
| 2,347,682 | Gunness | May 2, 1944 |
| 2,381,696 | Shapleigh | Aug. 7, 1945 |
| 2,431,632 | Brandt | Nov. 25, 1947 |
| 2,436,282 | Bennett | Feb. 17, 1948 |

FOREIGN PATENTS

| Number | Country | Date |
|---|---|---|
| 196,972 | Great Britain | May 4, 1943 |

OTHER REFERENCES

Bone and Townsend: "Flame and Combustion in Gases," Longmans, Green and Co., Ltd., London, 1927, pp. 462–464.